April 27, 1926.

H. A. DUNBAR

LATH CUTTING MACHINE

Filed August 21, 1924      5 Sheets-Sheet 1

1,582,027

INVENTOR
HENRY A. DUNBAR

BY
ATTYS.

April 27, 1926. 1,582,027
H. A. DUNBAR
LATH CUTTING MACHINE
Filed August 21, 1924 5 Sheets-Sheet 5

INVENTOR
HENRY. A. DUNBAR
BY Fetherstonhaugh & Co.
ATTYS.

Patented Apr. 27, 1926.

1,582,027

UNITED STATES PATENT OFFICE.

HENRY AGUSTA DUNBAR, OF WOODSTOCK, NEW BRUNSWICK, CANADA.

LATH-CUTTING MACHINE.

Application filed August 21, 1924. Serial No. 733,379.

*To all whom it may concern:*

Be it known that I, HENRY AGUSTA DUNBAR, a subject of the King of Great Britain, and resident of Woodstock, in the Province of New Brunswick and Dominion of Canada, have invented certain new and useful Improvements in Lath-Cutting Machines, of which the following is a specification.

This invention relates to improvements in lath machines and the objects of the invention are to provide an improved machine of this character and in which saws of much lesser gage than those heretofore in use can be used to give more satisfaction and greater efficiency.

Further objects are to provide an improved machine of this description in which a greater number of laths will be produced from a given quantity of wood and in which by decreasing the amount of sawdust from a given number of laths the expense in connection with the disposal of this by-product will be reduced.

A still further object is to provide a lath machine in which the strain on the wood during the sawing is reduced thereby reducing the number of laths broken during the operation of sawing.

Still further objects are to so improve and simplify the construction of the various parts as to better adapt them to perform the functions required of them.

With the foregoing and other objects in view the invention consists essentially in the combination of thin saws and collars running upon arbors supported in adjustable bearings in such a manner that each cut is made by two or more saws.

Referring now to the drawings in which like characters of reference indicate corresponding parts in each figure.

Figure 1:
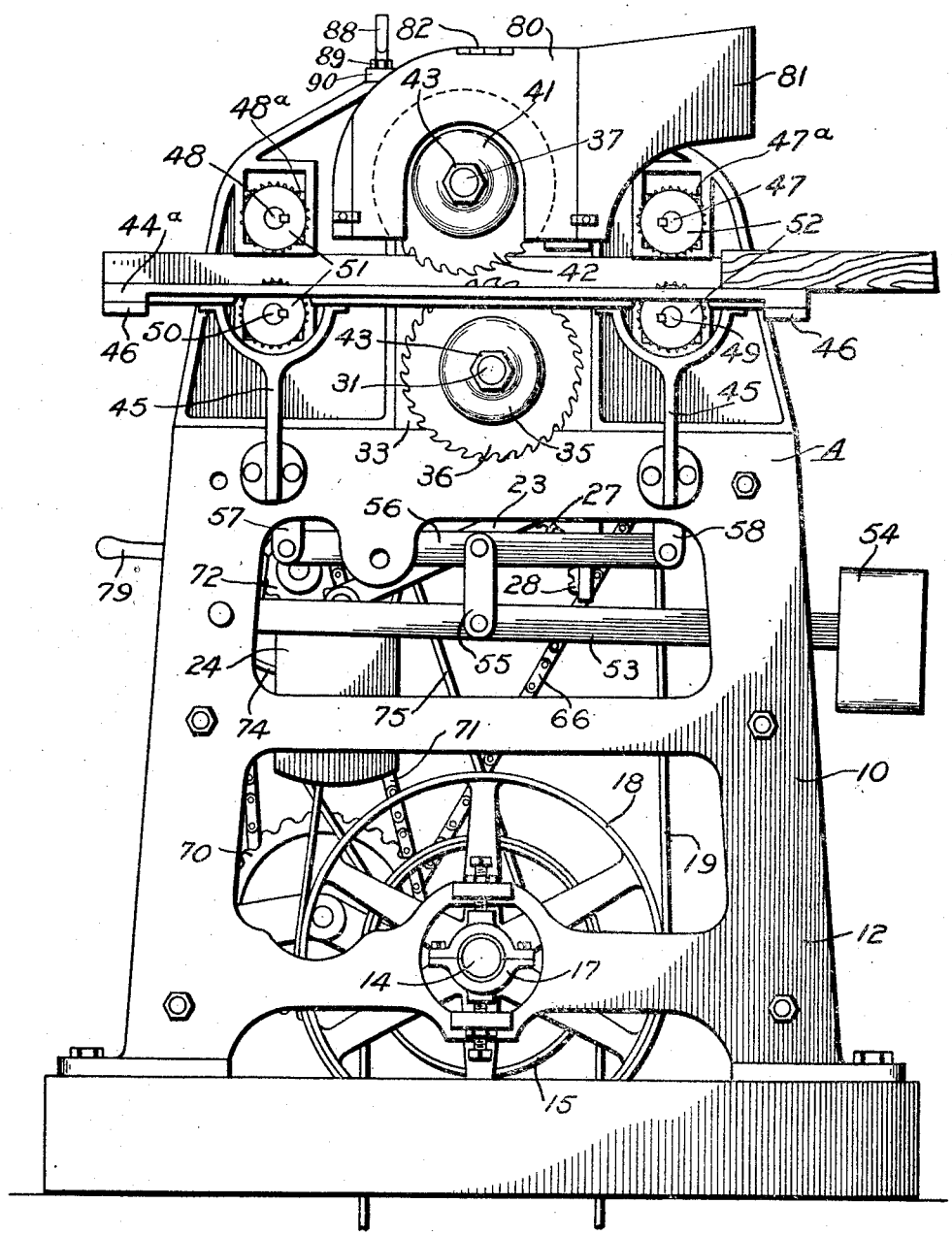
Figure 1 is a side elevation of the left hand side of the machine.
Figure 2:
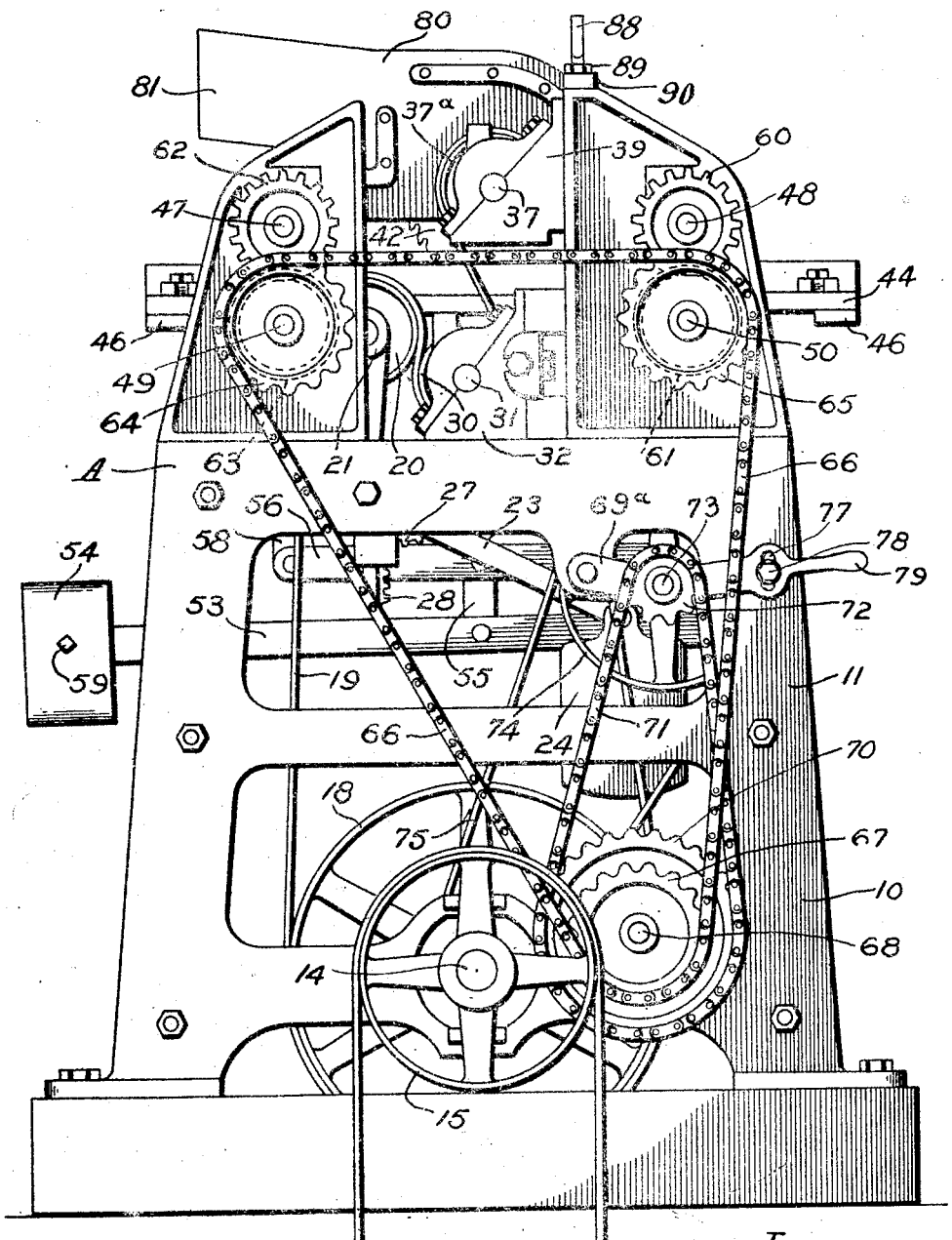
Figure 2 is a side elevation of the right hand side of the machine.
Figure 3:
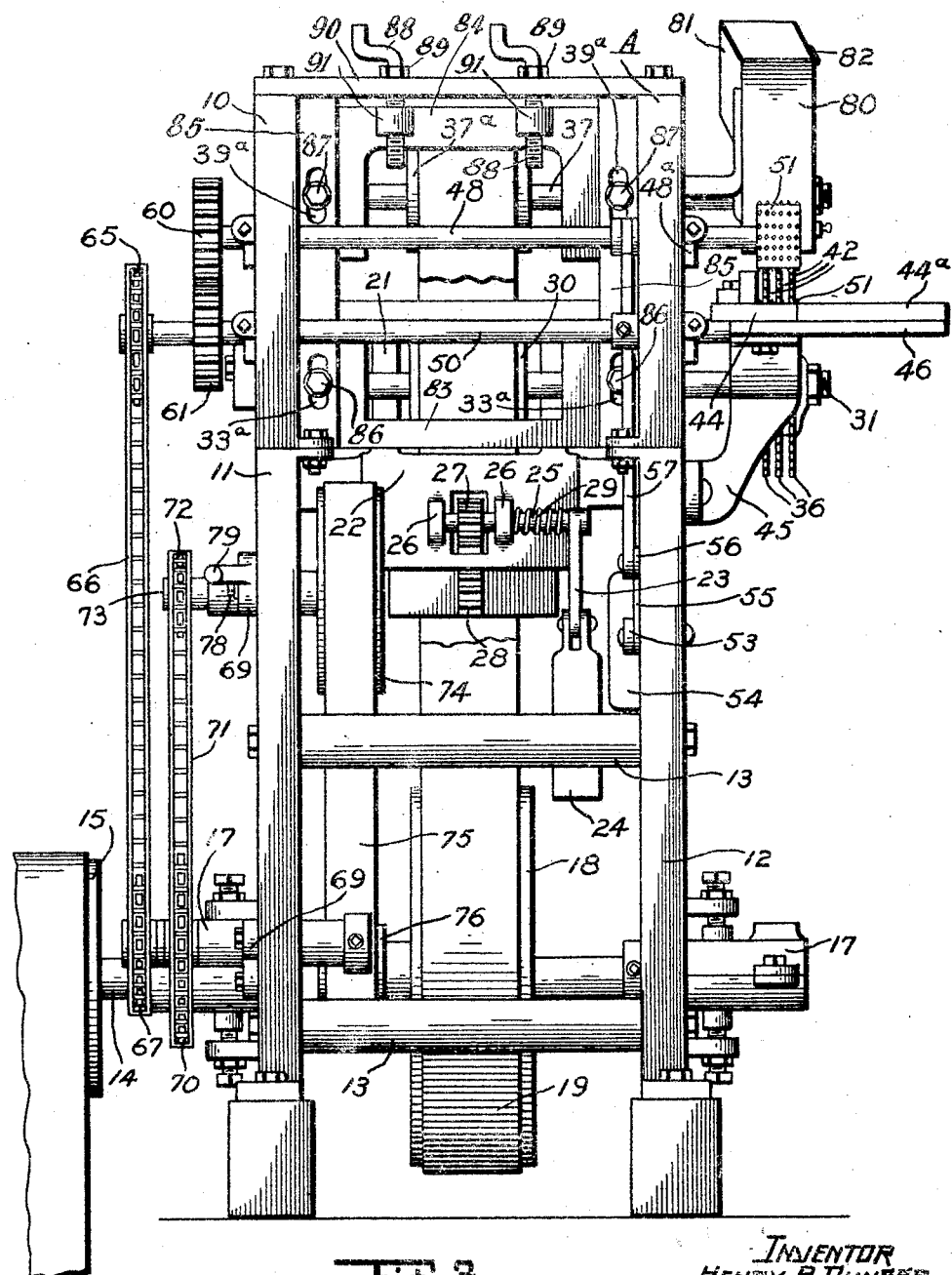
Figure 3 is a rear elevation of the machine.
Figure 4:
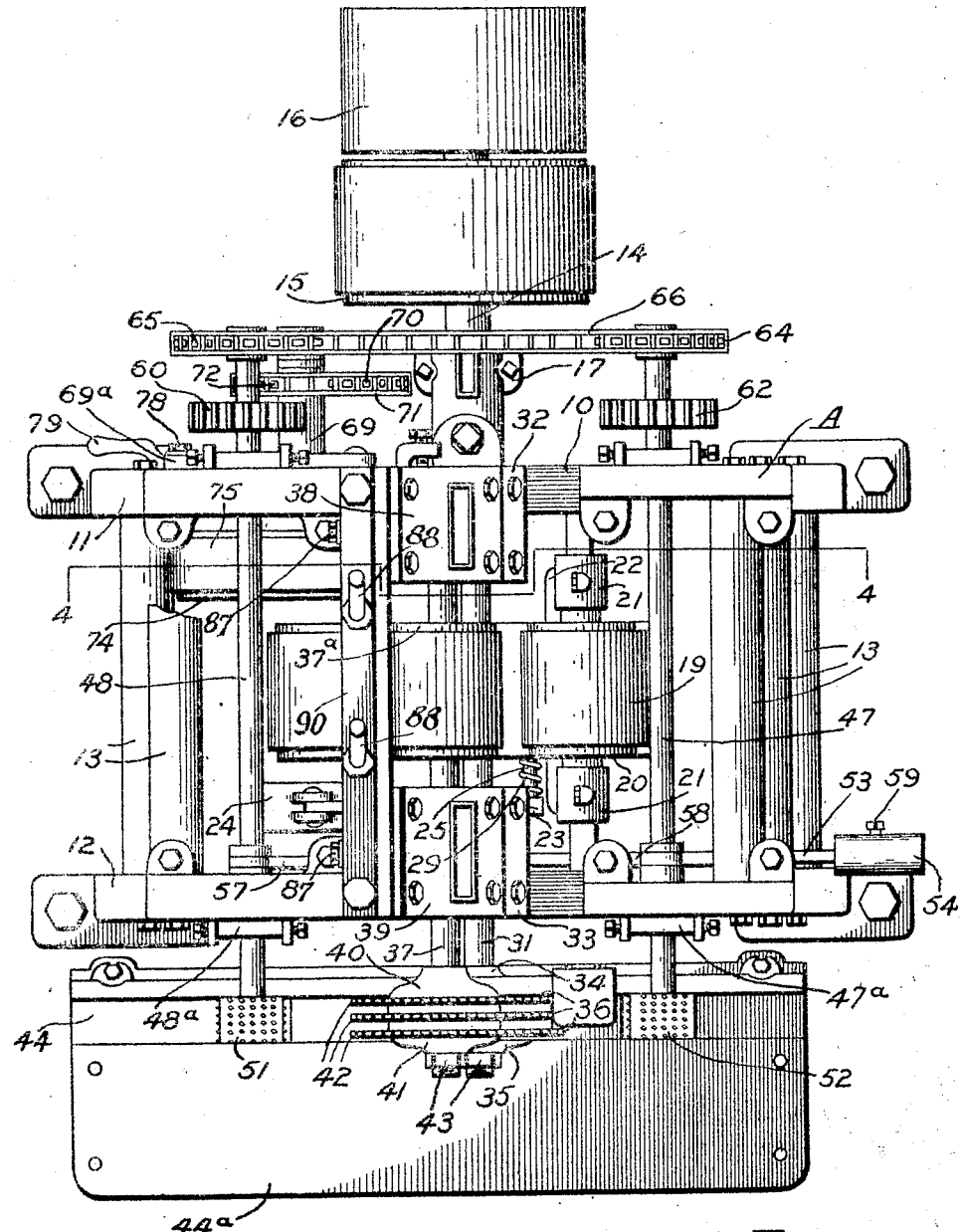
Figure 4 is a top plan view with saw guard removed.
Figure 5:
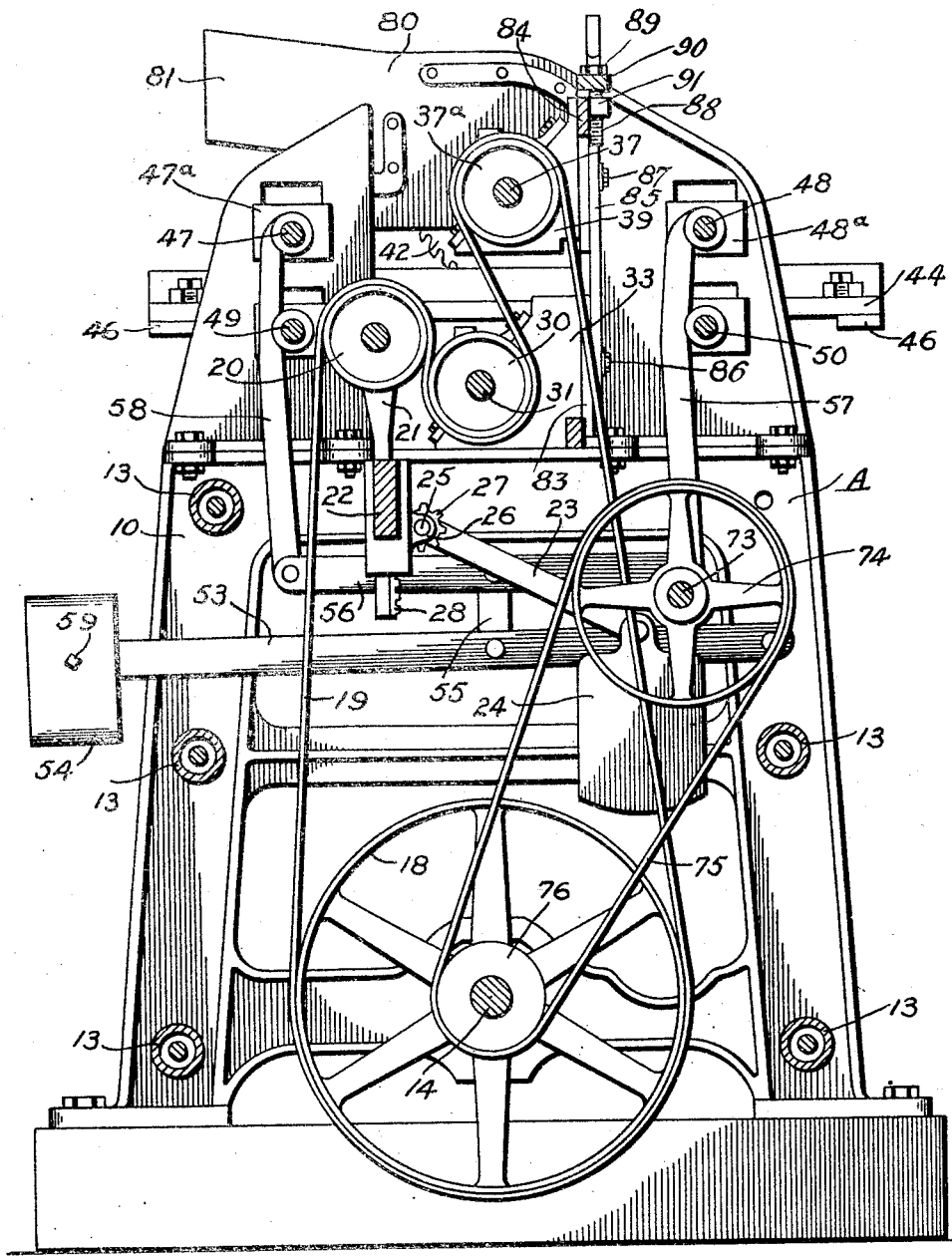
Figure 5 is a section on line 4—4 of Figure 4.

In the drawings A designates the machine as a whole consisting of a suitable frame 10 adapted to support the mechanism including the driving mechanism, the adjustable saw-carrying arbors and the mechanism for moving the lumber to be cut. The frame 10 may be of any well known construction and is here shown as comprising a pair of skeleton metal standards 11 and 12 suitably connected by cross-bars 13 and slotted at the top to carry the bearing boxes for the saw-driving mechanism.

Referring now more particularly to the driving mechanism, this consists of a driving shaft 14 provided with a driving pulley 15 and idler 16, the driving pulley 15 being designed to be belt or otherwise connected to the source of power. This driving shaft 14 is carried in suitable split bearings 17 supported in the frame and extending transversely thereof and therebeyond. Within the frame, keyed to the shaft 14 is the main driving pulley 18 connected by a belt 19 to a pulley 20 adapted to act as a belt tightener and mounted in a bracket bearing 21 in turn adjustably mounted on the transversely extending cross-bar 22 formed with an offset provided with guideways with which the bracket bearing 21 is adapted to slidably engage and whereby the pulley 20 carried thereby may be raised or lowered or in other words adjusted to tighten or slacken the belt 19.

This belt tightener is automatically operated by means of an arm 23 pivotally connected at its lower end to a weight 24 and keyed to a spindle 25 at its upper end, the spindle 25 extending through bearings 26 on the cross bar 22 and having, keyed between said bearings, a gear 27 adapted to mesh with the rack 28 carried by the slidably operable bracket member 21. The spindle 25 is also spring actuated by means of a coil spring 29 between the end of the arm 23 and the bearing 26, and whereby the bracket 21 is designed to retain the pulley 20 in belt tightening position.

We now come to the saw-driving mechanism, the belt 19 engaging next with the saw-driving pulley 30 fixedly mounted on an arbor 31 in turn carried by bearing boxes 32 and 33 adjustably mounted on the frame. The arbor 31 is designed to extend outside of the frame and is provided with a fixed collar 34 and an adjustable collar 35 between which are designed to be mounted the saws 36. These saws may be termed the lower saws. Parallel with and above the arbor 31 is the second arbor 37 provided with the upper saw-driving pulley 37ª similar to the lower saw-driving pulley 30. This arbor is similarly mounted in bearing boxes 38 and 39 to the arbor 31 but is slightly out of alignment therewith and it is also provided with a fixed collar 40 and an adjustable collar 41 adapted to carry therebetween the upper saws 42. The arrangement of the arbors 31 and 37, out of alignment with one another and carrying the lower and upper saws respectively is to prevent the saws in operation being directly opposite one another when simultaneously cutting the lumber.

From the foregoing it will be seen that on the main driving shaft 14 being operated the pulley 18 will be rotated to operate through the belt 19, the belt tightener pulley 20, the lower saw-driving pulley 30 and the upper saw-driving pulley 37ª, in turn operating the lower saw-carrying shaft or arbor 31 and the upper saw carrying shaft or arbor 37. The outer ends of the arbors 31 and 37 are screw-threaded to engage with securing nuts 43 whereby the adjustably mounted saw retaining collars 41 and 35 are secured to hold the saws in position and whereby on the nuts being removed and the collars 41 and 35 slipped off the saws can be quickly and easily replaced or changed. On the outside and extending the full length of the machine and slightly therebeyond is a saw table 44. This table consists of a stationary mounted portion 44 supported on brackets 45 secured to the side of the machine and a detachably mounted portion 44ª on supporting brackets 46, fixedly secured to the stationary portion 44. The stationary portion of the table is suitably recessed to permit the lower saws to extend partially therethrough.

It will thus be seen that to quickly reach the saws it is only necessary to lift the detachably mounted portion 44ª, of the saw table, off the supports 46.

Dealing now with the mechanism for feeding lumber to the saw table, this consists essentially of two pairs of cross shafts, arranged at each end of the frame, the members of which 47, 48, and 49 and 50, are carried in suitable bearings in the frame and arranged one above the other so that their protruding ends will come above and below the table 44. On the table end of these shafts are mounted upper and lower toothed feed rollers arranged in pairs 51 and 52, the lowermost of said rollers being on a level or protruding slightly above the surface of the table 44 and the uppermost rollers registering therewith but slightly spaced therefrom. The bearing boxes 47ª and 48ª, for the shafts 47 and 48 carrying the uppermost of these rollers, are adjustably mounted to move upwardly and downwardly in openings lined in the frame and are raised or lowered by means adjustably mounted on a lever arm 53 connected to a vertical link 55 and a horizontal link 56 pivotally connected at each end to vertical links 57 and 58 in turn designed to engage with the shafts 47 and 48 to move them. The weight 54 is also adjustable so that the position of the upper feed rollers of the pairs 51 and 52, in relation to the lower feed rollers of said pairs, can be accurately set by moving the weight 54 inwardly or outwardly on the arm 53, 59 is a retaining screw for said weight.

On the other protruding ends of the feed roller shafts 47, 48, 49 and 50 are gear wheels 60, and 61, 62 and 63, respectively, the gear wheel 60 being designed to mesh with the gear wheel 61 and the gear wheel 62 with the gear wheel 63. On the lower feed roller shafts 49 and 50 are also keyed sprocket wheels 64 and 65 connected by a chain 66 to a sprocket wheel 67 on stub shaft 68 mounted in a bracket bearing 69 fixedly secured to the frame. This stub shaft also carries a larger sprocket wheel 70 connected by a chain 71 with a small sprocket wheel 72 on a short or stub shaft, similarly mounted in the frame to the shaft 68, and having keyed thereon a pulley 74 connected by a belt 75 with a small pulley 76 on the main driving shaft 14 whereby, on the main driving shaft 14 being operated, the pulley 74 through the belt 75 is rotated to operate the shaft 73 with the small sprocket 72 thereon to in turn rotate, through the chain 71 and large sprocket 70, the shaft 68 which operates the smaller sprocket wheel 67 which in turn through chain 66 operates, through the sprockets 64 and 65 and gears 60, 61, 62 and 63, the feed roller carrying shafts 47, 48, 49 and 50.

The arrangement of a small pulley, then a large pulley, a small sprocket wheel and then a large sprocket, in the aforementioned driving mechanism for the feed rollers, provides for running the latter at a lesser speed than that at which the saws are operated.

It should be noted that the bracket 69ª, similarly constructed to the bracket 69, instead of being fixedly secured to the frame is adjustably secured by means of a slot 77 therein, whereby it can be raised or lowered on the retaining screw 78, the raising or lowering being designed to tighten or loosen the chain 71. This bracket 69ª is also provided with a suitable handle 79.

From the foregoing it will be seen that as the saw-driving mechanism is operated, as already described, simultaneously therewith a lumber moving mechanism is also operated, both running smoothly and efficiently and providing in the combination a self-contained lath cutting machine.

It should also be noted, in regard to the feed rollers, that while the uppermost of these rollers turn from right to left the lowermost turn from left to right.

To catch the sawdust I provide a casing 80 adapted to fit over the saws and formed with an extension 81 to be connected to a discharge conduit in any well known manner, the body portion of the casing being hinged in one side at 82 to provide ready access to the saws by simply swinging the side backwards.

With reference to the saw-carrying arbors 31 and 37 and to their adjustment, this is performed in the case of the lower arbor 31 by means of an adjustably mounted, U-shaped member 83 with which the bearing boxes 32 and 33 for the arbor 31 are formed integral, while in the case of the upper arbor 37 an inverted, adjustably mounted, U-shaped member 84 is used and with which the bearing boxes 38 and 39 for the arbor 37 are formed integral. Both these members 83 and 84 are designed to slidably engage with flanges 85, extending inwardly from the frame, by means of bolts 86 and 87 extending through elongated slots 33ª and 39ª in the members 83 and 84 and into said flanges so that, when it is desired to adjust the arbor 31, the bolts 86 are loosened permitting the arbor to be raised or lowered to a required position when the bolts 86 and 87 are then tightened to retain the arbor in adjusted position. Both arbors may be adjusted in this way, the arbor 37 being raised or lowered on the bolts 87 being loosened.

Furthermore the upper arbor 37 may be also adjusted by means of hand operated adjusting screws 88 provided with lock nuts 89. These screws extend through a cross bar 90 to engage with lugs 91 formed integral with the inverted, U-shaped member 84 carrying the arbor 37, the adjustment being made by first loosening the bolts 87, then operating the adjusting screws 88 to raise or lower the arbor and then tightening the bolts 87 to retain the arbor in adjusted position.

As many changes could be made in the above construction and many apparently widely different embodiments of my invention within the scope of the claims, constructed, without departing from the spirit or scope thereof, it is intended that all matter contained in the accompanying specification and drawings shall be interpreted in an illustrative and not in a limiting sense.

What I claim as my invention is:

1. In a machine of the character described and in combination, a suitable frame, a saw table, saws arranged above and below said table, arbors for the saws, a detachable U-shaped head and a detachable, inverted U-shaped head having integral therewith bearing boxes for said arbors, means for slidably mounting the head members on the frame including a flanged portion on the frame having orifices therein adapted to slidably engage with the head members and elongated bolt receiving means through the head members adapted to register with the orifices in said flanges whereby the head members are raised or lowered and retained in adjusted position when raised or lowered.

2. In a machine of the character described and in combination, a frame, upper and lower saw-carrying arbors on said frame, means for adjustably supporting the arbors comprising flanges formed on the frame provided with orifices therein, an inverted, U-shaped head member adapted to slidably engage with said flanges and having elongated slots therein designed to register with the flange orifices, bearing boxes formed integral with said head member adapted to support the upper saw-carrying arbor, a U-shaped head member having slots therein registering with the flange orifices and adapted to slidably engage with the frame flanges and bearing boxes formed in said head adapted to support the lower arbor and means through said slots and flange orifices whereby the arbor-carrying heads are adapted to be raised or lowered and retained in position when raised or lowered, automatically adjustable means for feeding material to the saws and auxiliary adjusting means for the upper member.

3. The machine as claimed in claim 2 in which the auxiliary adjusting means for the upper saw-carrying arbor comprise a cross-bar on the machine and lugs formed on the arbor-carrying head and screw bolts adapted to extend through the cross-bar and to engage with said lugs whereby, on the screw bolts being hand operated, the arbor supporting head is moved upwardly or downwardly to adjust the saws on the saw-carrying arbor.

In witness whereof I have hereunto set my hand.

HENRY AGUSTA DUNBAR.